United States Patent

[11] 3,588,708

[72] Inventors Richard A. McBride
Palo Alto; Reginald S. Herbert, Mountain View; Warren S. Weintraub, Cupertino, all of Calif.
[21] Appl. No. 707,688
[22] Filed Feb. 23, 1968
[45] Patented June 28, 1971
[73] Assignee Varian Associates
Palo Alto, Calif.

[54] SQUARE WAVE SYMMETRY CONTROL CIRCUIT FOR USE IN MAGNETOMETER READOUT CIRCUITS
2 Claims, 5 Drawing Figs.

[52] U.S. Cl. ........ 324/58, 328/28, 307/261, 307/265, 324/0.5
[51] Int. Cl. ........ G01r 33/08, H03k 5/04, H03k 1/14
[50] Field of Search ........ 324/.5 (Inquired), 83 (FCE), 83 (A); 307/265, 261, 268; 328/58, 28, 35, 36, 155 (Inquired), 13

[56] References Cited
UNITED STATES PATENTS
3,258,605 6/1966 Clark ........ 307/265X
3,274,514 9/1966 Foulger ........ 328/58
3,193,770 7/1965 Marshall, Jr. ........ 328/155

*Primary Examiner*—Alfred E. Smith
*Attorneys*—William J. Nolan and Leon F. Herbert

ABSTRACT: The readout circuit comprises in sequence a limiter, a square wave symmetry control circuit, a frequency discriminator and a transient suppressor. The frequency and amplitude modulated sinusoidal magnetometer signal is translated into square waves by the limiter. Since the amplitude modulation would cause the square waves to be asymmetrical and degrade the performance of the circuit, the square wave symmetry control circuit generates an error signal which is used to eliminate the effects of amplitude modulation. The frequency discriminator produces an output signal which varies in accordance with the input frequency from the magnetometer. This output signal when plotted against input frequency comprises a ramp or sawtooth, with a period of 1000 Hz., such that the sawtooth repeats for each 1000 Hz increment of input frequency. A second phase detector produces an identical sawtooth output shifted in frequency by 500 Hz. with respect to the first. A logic switch sensitive to the amplitude of each of the sawtooth waves switches the following circuits between the frequency discriminator outputs to avoid signal distortions which develop at the transition points of the sawtooth waves. A transient suppressor prevents transients from saturating the following filter circuits when different DC levels exist on the discriminator outputs at the time of switching. By feeding back the signal being monitored to the output of the unused channel of the frequency discriminator, the same signal is forced to be present on both channels when switching takes place.

INVENTORS
RICHARD A. MC BRIDE
REGINALD S. HERBERT
WARREN S. WEINTRAUB

BY

ATTORNEY

INVENTORS
RICHARD A. MC BRIDE
REGINALD S. HERBERT
WARREN S. WEINTRAUB

BY

ATTORNEY

SQUARE WAVE SYMMETRY CONTROL CIRCUIT FOR USE IN MAGNETOMETER READOUT CIRCUITS

CROSS-REFERENCES TO RELATED APPLICATIONS

The subject matter disclosed herein comprises as well the No. matter of copending U.S. application Ser. No. 707,689 filed Feb. 23, 1968 now U.S. Pat. No. 3,532,978 entitled, "-Frequency Discriminator for Use in Magnetometer Readout Apparatus," and U.S. Pat. No. 3,518,531 issued June 30, 1970 entitled, "Transient Suppressor for Use in Magnetometer Readout Apparatus," both assigned to the same assignee as the instant application.

BACKGROUND OF THE INVENTION

The present invention relates in general to magnetometer readout circuits and in particular to a novel square wave symmetry control circuit for improving the symmetry of square waves fed to a digital frequency discriminator.

A magnetometer is used in measuring the intensity of a magnetic field and quite frequently, the signal obtained, often a precession signal, exhibits a frequency which is a function of magnetic field intensity. To process the signal information rapidly, reliably and accurately, digital techniques are often employed. The transformation from sine wave signals to square waves is performed generally by a limiter, the square wave repetition rate being directly proportional to the frequency of the input sine wave.

Unfortunately, the signal from the magnetometer, in addition to frequency modulation, also exhibits amplitude modulation which causes the pulses on the output of the limiter to be somewhat asymmetrical. The asymmetry of the pulses is reflected in phase jitter in the following circuits and in particular, the output of the frequency discriminator used to develop a DC output voltage as a function of the precession signal frequency.

SUMMARY OF THE INVENTION

In accordance with the present invention, the square waves made available for further processing by the following circuits, in particular, a frequency discriminator, are made symmetrical.

The square wave output of a limiter is coupled to the inverting input of a differential comparator. The output of the differential comparator is transmitted on two paths to a phase detector, preferably a conventional flip-flop. One of the paths from the comparator is coupled directly to the set input of the phase detector, the other path is coupled to the reset input after passing through an inverter to enable the phase detector to compare the leading and lagging edges of the applied pulse. The output of the phase detector, taken across the Q and $\overline{Q}$ outputs of the flip-flop, is applied to an integrator which extracts a DC error signal from the phase detector output. The error signal is amplified and fed back to the noninverting input of the comparator to control the latter's switching point.

Accordingly, a primary object of the present invention is apparatus for improving the symmetry of square waves for use in magnetometer readout apparatus.

Another object of the present invention is apparatus for improving the symmetry of square waves with means for comparing the leading and lagging edges of square waves for providing an error signal to correct any asymmetry which may exist in the square waves.

Another object of the present invention is apparatus as described in which said error signal is applied to a differential comparator to control the switching point of the latter.

Other objects, features and advantages of the present invention will become apparent in the following detailed description when considered together with the accompanying drawings in which.

Figure 1:
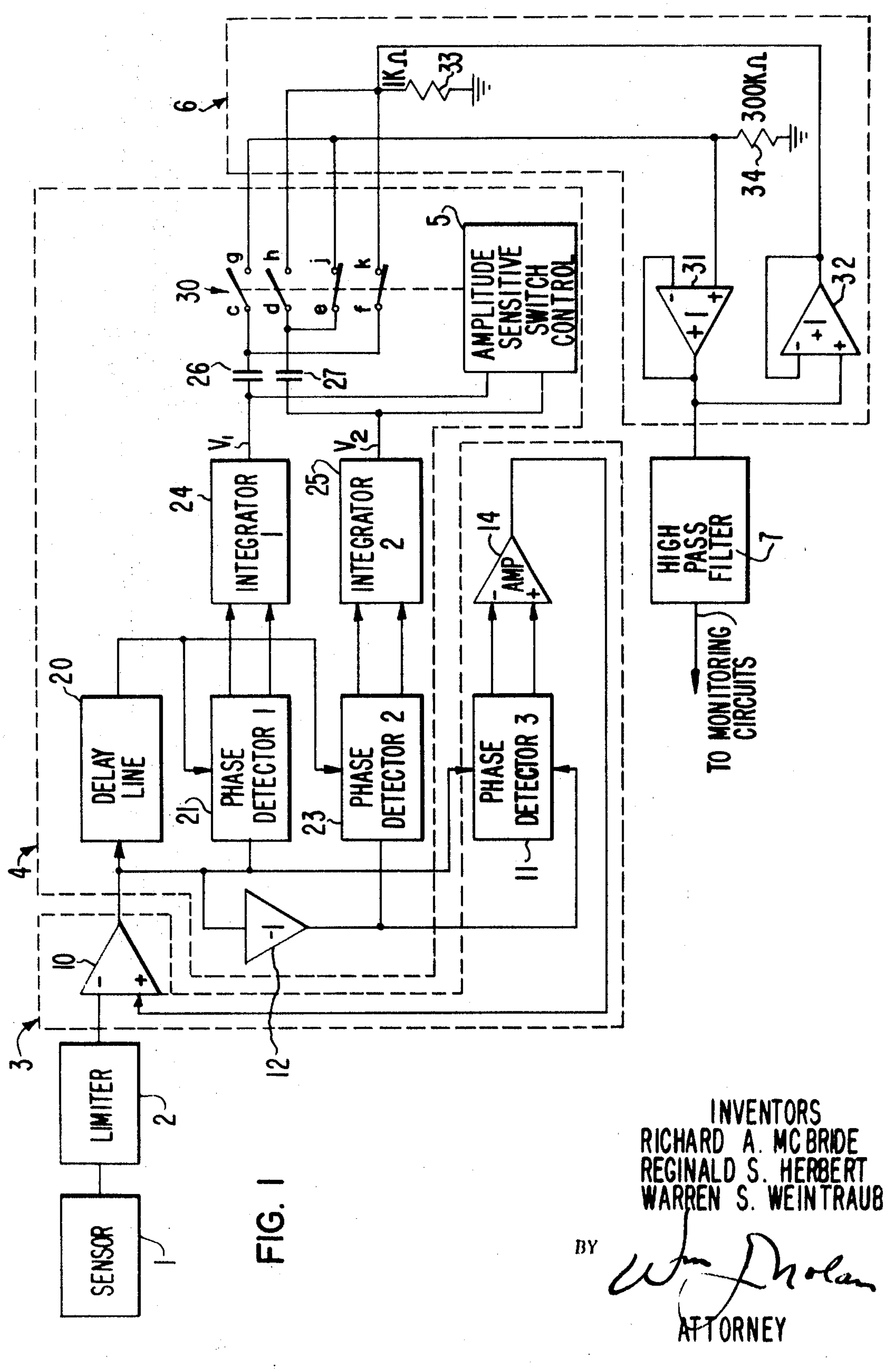
FIG. 1 is a block diagram of the circuit embodying the present invention.

In FIG. 1 there is shown a magnetometer readout apparatus embodying the present invention. A sensor 1, such as a magnetometer and a limiter 2 are coupled to a square wave symmetry control circuit 3. The square wave symmetry control circuit 3 provides symmetrical square waves or pulses to a frequency discriminator 4. The output of frequency discriminator 4 is coupled by means of an amplitude sensitive switch 5 to a transient suppressor 6. The output of transient suppressor 6 provides, in turn, a useable transient and distortion free signal to a high pass filter 7 which functions as the input element for following monitoring circuits (not shown).

Sensor 1, which may be, for example, an alkali vapor magnetometer provides a precession signal in the form of a sine wave the frequency of which is directly proportional to the intensity of a magnetic field being measured. The precession signal, in addition to frequency modulation, also exhibits amplitude modulation which may range from 0.5 volts to 5 volts peak-to-peak.

Limiter 2, which functions to transform the precession sine wave signal into a representative square wave signal, produces a square wave which is caused to be asymmetrical as a result of the amplitude modulation of the precession signal. For reasons given presently, the asymmetry of the limiter 2 output square waves is reflected in the output of frequency discriminator 4 in the form of phase jitter. The square wave symmetry control circuit 3 is provided, therefore, between limiter 2 and frequency discriminator 4, to eliminate the phase jitter by phase comparing the leading and lagging edges of each of the square waves received from limiter 2 by generating therefrom a compensating error signal.

Frequency discriminator 4 is adapted to receive and phase compare to itself each of the square waves from the square wave symmetry control circuit 3 after each has been delayed a predetermined number of microseconds $\tau$. As will be described more fully with respect to FIG. 3, the resulting outputs of frequency discriminator 4 are two channels or output signals of DC voltage levels which vary as a function of the frequency of the sine wave signal from sensor 1. Over the entire frequency range of interest the DC voltage levels take the form of a sawtooth the period of which is determined by the delay $\tau$ and is equal to a frequency change of $1/\tau$ Hz. The ramp or sawtooth signals provided on each of the two output channels, say channel 1 and channel 2, of frequency discriminator 4 are effectively offset by $1/2\tau$ Hz. with respect to each other and coupled by means of amplitude sensitive switch 5 to transient suppressor 6.

Figure 3:
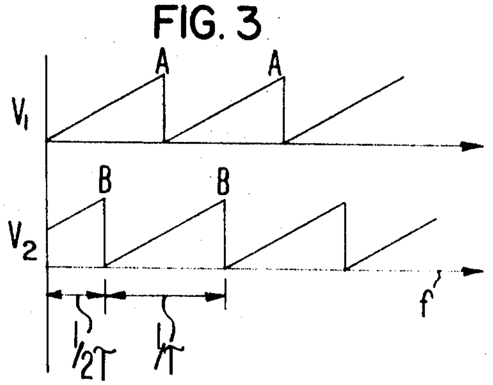
FIG. 3 is a diagram of the sawtooth voltage output of the frequency discriminator.

Amplitude sensitive switch 5 detects the amplitude of each of the ramp signals and switches transient suppressor 6 from one channel to the other when the amplitude of the ramp on the channel being monitored reaches a predetermined level, say 75 percent of the maximum. By switching before the ramp being monitored reaches maximum, the large change in DC voltage at the transition points A and B as shown in FIG. 3 will only distort the signal in the channel not being monitored.

While the distortion at the transition points may be thus avoided, a difference in the DC and AC level between channels 1 and 2 at the time of switching will still result in saturation of the high pass filter 7. To avoid this source of saturation and the resultant signal distortion in the high pass filter 7, the transient suppressor 6 is coupled between amplitude sensitive switch 5 and high pass filter 7. By monitoring the signal being delivered to high pass filter 7 and feeding it back in phase to the output of the channel not then being monitored, transient suppressor 6 forces the high pass filter 7 to "see" the same DC and AC level on both channels at the time switching takes place.

Referring now to FIGS. 1, 2, 3, and 4, a detailed discussion of the circuits will now be undertaken.

Limiter 2, consisting of seven stages of gain-limiting amplifiers puts out a square wave the leading and lagging edges of which vary in relation to each other as a function of the amplitude of the incoming sine wave precession signal. This is due to the fact that the transistors comprising the limiter 2 "turn on" and "turn off" at specified input signal levels. Thus, the transistors will be turned on sooner and turned off later for high amplitude signals than for low amplitude signals of the same frequency.

To correct the asymmetry of the square wave thus produced, there is provided a differential comparator 10 the inverting input (−) of which is coupled to the output of limiter 2. The output of comparator 10 is coupled to the inputs of a flip-flop linear phase detector 11 directly and through an inverter 12, respectively. Since phase detector 11 is designed to operate on positive going pulses, the result is that the leading and lagging edges of the square waves are compared. The net result is that phase detector 11 provides a zero output when the inputs are 180° out of phase and a nonzero output when any other relationship exists. The error signal at the output of phase detector 11 is then amplified in an amplifier 14 and applied to the noninverting input of comparator 10 for controlling its switching point. The resulting symmetrical square waves are then coupled to the frequency discriminator 4.

As shown in FIG. 1, the square waves from square wave symmetry control circuit 3 are applied simultaneously to the inputs of a delay network 20, a first linear phase detector 21 and the inverter 12 discussed above with respect to symmetry control circuit 3. The output of inverter 12 is coupled to a second linear phase detector 23. The output of delay network 20, for example, a magnetostrictive delay line, is coupled to both phase detector 21 and 23 to reference both phase detectors to the same signal. Both phase detectors 21, 23 are preferably flip-flops and preferably, the delayed signal is applied to their respective reset inputs. It should be understood, however, that the set inputs could be used as well.

Figure 2:
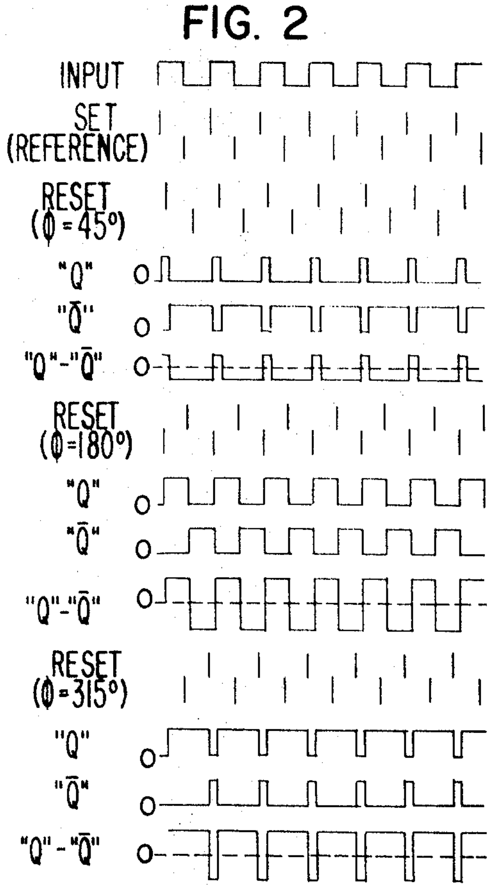
FIG. 2 is a pulse diagram of the input and output voltages associated with one of the frequency discriminator phase detectors.

As shown in FIG. 2 which shows the input and output pulses for one of the phase detectors, a phase detector is set on the leading edge of a positive going pulse. Phase detector 21 is set on the leading edge of the pulses from square wave symmetry control circuit 3, whereas, due to inverter 12, phase detector 23 is set on the trailing edge. Since both phase detector 21 and 23 are reset a time $\tau$ later by the leading edge of the same pulse, it is apparent that any change in asymmetry between the leading and trailing edges of the square waves would be reflected as phase jitter between the inputs of phase detector 23. This phase jitter is eliminated by square wave symmetry control circuit 3 as heretofore discussed.

In series with and coupled to the outputs of phase detectors 21, 23, respectively, are provided a pair of integrators 24, 25, and a pair of DC blocking capacitors 26, 27. Integrators 24, 25 integrate the outputs of phase detectors 21, 23 respectively, yielding, as shown in FIG. 3, an output that has a sawtooth wave form as a function of frequency.

The two sawtooth wave forms as shown in FIG. 3 are repetitive in 1 kHz. increments of the input signal where the delay $\tau$ provided by delay network 20 is 1,000 microseconds and can be expressed mathematically as $$V_{\text{out}}=-V+K(f-f_L)\pm\frac{mK}{2}(1000,-V<V_{\text{out}}<V$$

where $V_{out}$ is output DC voltage, K is the gain constant in volts/Hertz, $f_L$ is the input frequency to the nearest lowest thousand, $f$ is the input frequency, $m$ is 0,1 and $|V|$ is the DC limit on the output. The 1 kHz. increments of the output sawtooth signal are thus equal to the reciprocal of the predetermined delay $\tau$ which for purposes of illustration is assumed to be 1,000 microseconds.

In terms of a sine function, the inputs to the set and reset of the phase detector 21 or phase detector 23 are sin $\omega t$ and sin $(\omega t-\tau)$, respectively, where $\omega\tau$ represents the phase shift of the delay network 20 as a function of frequency where the points of discontinuity A and B, as shown in FIG. 3, can be seen to occur at $\omega\tau=2\pi$ radians or $f=1/\tau$ Hz. and thus, as the frequency varies, the phase relationship varies to that different DC voltages are obtained as a function of frequency.

Referring again to FIG. 2, there is shown a typical pulse diagram disclosing the Q and $\bar{Q}$ outputs of one of the phase detectors, for three different phase relationships, i.e. $\omega\tau=45°$, 180° and 315°. In practice, the phase detector output is taken between Q and $\bar{Q}$ and applied to the input of its associated integrator. The output of the integrator is, as indicated, in the form of a sawtooth. Without regard to polarity, it can be seen by reference to FIG. 4 that the phase detector output voltage and accordingly the associated integrator output voltage is a minimum at 0° and a maximum at 360°. Zero output voltage is obtained at 180°.

Figure 4:
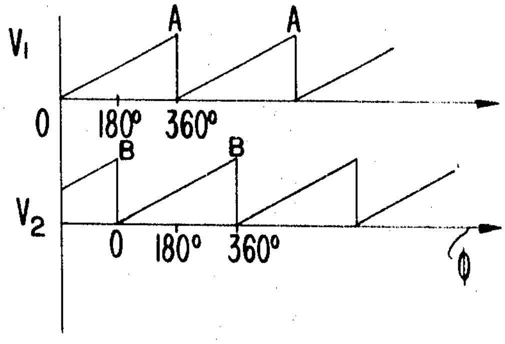
FIG. 4 is a diagram of the sawtooth voltage output signals of FIG. 3 in terms of relative phase angle.

While similar in form, the outputs of integrators 24, 25 are, as noted in FIGS. 3 and 4, displaced as a function of frequency by $1/2\tau$ Hz. relative to each other. This apparent 1/2 cycle shift is brought about by referencing both phase detectors 21, 23 with the signal from delay network 20 and triggering each detector with the leading and lagging edge of the input pulse from square wave symmetry control circuit 3 respectively.

The relative phase displacement of the output sawtooth wave forms is used to avoid the discontinuities and resulting distortion which arise at the transition points A and B as shown in FIGS. 3, 4.

Referring to FIG. 1, the outputs of capacitors 26, 27 are alternatively or successively coupled to transient suppressor 6 and high pass filter 7 by means of a double-pole, double-throw relay 30 controlled by amplitude sensitive switch 5. In a first position, relay 30 passes the signal from capacitor 26 via pole C and contact $g$ to transient suppressor 6. In a second position, relay 30 passes the signal from capacitor 27 via pole $d$ and contact $h$ to transient suppressor 6. The signal to be passed is determined by the amplitude of the signal as measured at the output of integrators 24, 25 by amplitude sensitive switch 5.

In practice, switching is effected from one output to the other when the output being monitored reaches 75 percent of its maximum. Accordingly, the distortion which occurs at transition points A and B as shown in FIGS. 3, 4 will not be monitored.

Transient suppressor 6, in addition to passing the signal from either capacitor 26 or 27 to high pass filter 7, provides also for the elimination of transients due to differing DC and AC levels on the outputs of capacitors 26, 27 at the time of switching.

An operational amplifier 31 is connected to contact $g$ and $j$ of relay 30 for receiving the signal from either capacitor 26 or 27 depending on the position of relay 30. A feedback amplifier 32 is coupled to the output of amplifier 31 for feeding back to the output of the capacitor not being monitored via contacts $h$ and $k$ the same signal in both amplitude and phase as that being monitored. The result is that when switching occurs, the signal received by high pass filter 7 is the same as that which existed on the output of the capacitor which was being monitored at the time of switching. In order to reduce time lag in signals generated by the frequency discriminator 4, the unused capacitor is loaded by a low resistance 33 to ground coupled to the output of the feedback amplifier 32. Since the signal received by high pass filter 7 is the same regardless of which of the outputs of capacitors 26, 27 is being monitored, the signal to high pass filter 7 is not distorted, does not ring and consequently no information is lost and no switching transients are recorded.

Figure 5:
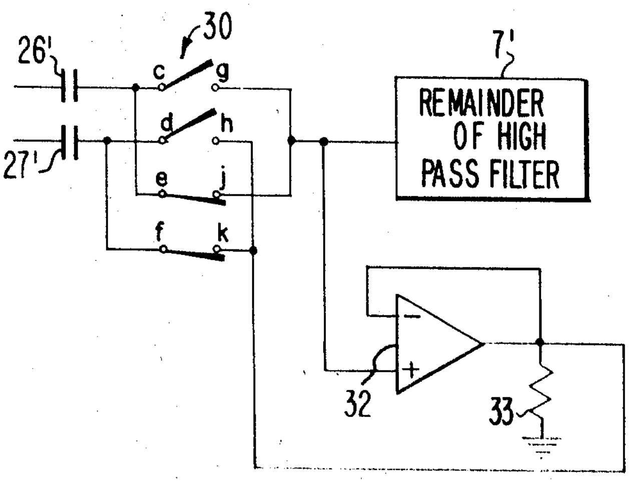
FIG. 5 is a partial schematic diagram of an alternative embodiment of the apparatus embodying the present invention.

Alternatively, as shown in FIG. 5, amplifier 31 may be omitted and high pass filter 7 connected directly to contacts $g$ and $j$ of relay 30. In that event, capacitors 26 and 27 will be replaced by capacitors 26' and 27', in practice, the input capacitor of high pass filter 7, now 7', split between the two outputs of frequency discriminator 4.

We claim:

1. A circuit apparatus for transforming a varying amplitude AC input signal into a symmetrical square wave output signal comprising: a limiter transforming said input signal into asymmetric square waves; and a square wave symmetric control circuit comprising, a differential comparator having a first input coupled to said limiter to receive said asymmetric square waves therefrom, and comparing means coupled to said differential comparator for producing an error signal having an amplitude indicative of the asymmetry of said square waves, said differential comparator having a second input which receives said error signal, said differential comparator producing a signal in response to said error signal and said symmetrical square wave output signal, said comparing means comprises an inverter having an input coupled to the output of said differential comparator; and a linear phase detector having a first input coupled to the output of said differential comparator and a second input coupled to the output of said inverter.

2. An apparatus according to claim 1 wherein said linear phase detector is a flip-flop.